(12) United States Patent  
Ortega et al.

(10) Patent No.: US 6,979,049 B2  
(45) Date of Patent: Dec. 27, 2005

(54) APPARATUS AND METHOD FOR REDUCING DRAG OF A BLUFF BODY IN GROUND EFFECT USING COUNTER-ROTATING VORTEX PAIRS

(75) Inventors: Jason M. Ortega, Pacifica, CA (US); Kambiz Sabari, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 11/100,201

(22) Filed: Apr. 5, 2005

(65) Prior Publication Data

US 2005/0206196 A1 Sep. 22, 2005

Related U.S. Application Data

(62) Division of application No. 10/668,812, filed on Sep. 22, 2003, now Pat. No. 6,926,345.
(60) Provisional application No. 60/412,417, filed on Sep. 20, 2002.

(51) Int. Cl.$^7$ ............................................... B60J 1/00
(52) U.S. Cl. .............................. 296/180.4; 296/180.1
(58) Field of Search ........................ 296/180.4, 180.1, 296/180.5

(56) References Cited

U.S. PATENT DOCUMENTS

| | | | | | |
|---|---|---|---|---|---|
| 4,113,299 | A | * | 9/1978 | Johnson et al. | 296/180.4 |
| 4,682,808 | A | * | 7/1987 | Bilanin | 296/180.4 |
| 4,776,535 | A | * | 10/1988 | Paterson et al. | 296/180.4 |
| 4,818,015 | A | * | 4/1989 | Scanlon | 296/180.2 |
| 5,348,366 | A | * | 9/1994 | Baker et al. | 296/180.4 |
| 6,257,654 | B1 | * | 7/2001 | Boivin et al. | 296/180.4 |
| 6,286,894 | B1 | * | 9/2001 | Kingham | 296/180.4 |
| 6,297,486 | B1 | * | 10/2001 | Rom et al. | 244/3.3 |
| 6,378,932 | B1 | * | 4/2002 | Fasel et al. | 296/180.5 |
| 6,692,066 | B2 | * | 2/2004 | Fairburn et al. | 296/180.1 |
| 6,742,616 | B2 | * | 6/2004 | Leban | 296/180.4 |
| 6,877,793 | B2 | * | 4/2005 | Cory | 296/180.4 |
| 2002/0030384 | A1 | * | 3/2002 | Basford | 296/180.1 |

* cited by examiner

Primary Examiner—Kiran B. Patel  
(74) Attorney, Agent, or Firm—James S. Tak; Alan H. Thompson

(57) ABSTRACT

An aerodynamic base drag reduction apparatus and method for bluff bodies, such as tractor-trailer trucks, utilizing a pair of lift surfaces extending to lift surface tips and located alongside the bluff body such as on opposing left and right side surfaces. In a flowstream substantially parallel to the longitudinal centerline of the bluff body, the pair of lift surfaces generate a pair of counter-rotating trailing vortices which confluence together in the wake of the bluff body in a direction orthogonal to the flowstream. The confluence draws or otherwise turns the flowstream, such as the flowstream passing over a top surface of the bluff body, in and around behind a trailing end of the bluff body to raise the pressure on a base surface at the trailing end and thereby reduce the aerodynamic base drag.

20 Claims, 4 Drawing Sheets

APPARATUS AND METHOD FOR REDUCING DRAG OF A BLUFF BODY IN GROUND EFFECT USING COUNTER-ROTATING VORTEX PAIRS

CROSS-REFERENCE TO RELATED APPLICATION

This application is a Divisional Application claiming priority from the U.S. patent application Ser. No. 10/668,812 filed Sep. 22, 2003, now U.S. Pat. No. 6,926,345 entitled "Apparatus and Method for Reducing Drag of a Bluff Body in Ground Effect using counter-rotating vortex Pairs" which claims the benefit of U.S. Provisional Patent Application No. 60/412,417 filed Sep. 20, 2002.

The United States Government has rights in this invention pursuant to Contract No. W-7405-ENG-48 between the United States Department of Energy and the University of California for the operation of Lawrence Livermore National Laboratory.

FIELD OF THE INVENTION

The present invention relates to aerodynamic drag reduction devices and methods, and more particularly to an aerodynamic base drag reduction apparatus and method for bluff bodies using counter-rotating vortices generated to confluence in the wake of the bluff body, so as to allow the flow to turn more sharply around the trailing end of the bluff body.

BACKGROUND OF THE INVENTION

As is well known in the art of vehicle design, the fuel consumption of a vehicle associated with its movement is directly related to certain aerodynamic characteristics of the vehicle, such as the aerodynamic drag of the vehicle expressed as the drag coefficient, Cd. As the aerodynamic drag experienced by a vehicle increases, the fuel costs also correspondingly increase due to the greater energy required to overcome the drag. For example, for a vehicle traveling 70 mph on a roadway, approximately 65% of the total fuel consumption of its engine is used to overcome aerodynamic drag. Thus, even a slight reduction in the aerodynamic drag coefficient of the vehicle can result in a significant improvement in fuel economy.

Bluff bodies in particular are known to have high drag coefficients due to the presence of a recirculation zone in the wake thereof, and the relatively lower pressures acting as a consequence on the rear base of the trailing end. The drag which results from the blunt-ended trailing ends of bluff bodies is commonly known as "aerodynamic base drag." Numerous attempts have been made over the years to reduce the aerodynamic base drag of blunt-ended bluff bodies, especially land-based vehicles such as tractor-trailers and trailer vans having a flat vertical base surface. Some of the proposed concepts are passive and include such implements as boattail plates, rounding the rear corners of the vehicle near its base, and streamlining the rear of the vehicle with ogives or wedges. Other proposed concepts are active, such as plumbing systems that inject or release air near the rear corners of the vehicle or acoustic systems that actively perturb the flow coming off the rear of the vehicle. Some example prior developments are shown in U.S. Pat. Nos. 4,682,808, 5,498,059, 6,286,894B1, and U.S. Patent Publication No. U.S. 2002/0030384A1. These examples illustrate variations on improving by reducing the aerodynamic base drag experienced by tractor-trailers having a substantially flat base surface at the trailing end. A common feature found in all of these patents is the placement of the drag reduction apparatus behind the trailing end of the trailer where access to the interior cargo space is typically provided.

The need for and benefits of reducing the aerodynamic base drag of bluff body vehicles, especially land-based vehicles traveling at, for example, highway speeds, are compelling and widely recognized. It would therefore be advantageous to provide a simple cost-effective base drag reduction apparatus and method for use on such bluff bodies having base surfaces creating a substantial recirculation zone, to influence the flowstream from a location other than behind the trailing end where cargo access may be obstructed, to raise the pressure on the base surface.

SUMMARY OF THE INVENTION

One aspect of the present invention includes an apparatus for reducing the aerodynamic base drag of a bluff body in a flowstream substantially parallel to a longitudinal centerline of the bluff body, said bluff body having a leading end, a trailing end, a top surface, opposing left and right side surfaces, and a base surface at the trailing end substantially normal to the longitudinal centerline of the bluff body, said apparatus comprising: a pair of lift surfaces located alongside at least one of the top surface and left and right side surfaces of the bluff body and extending to lift surface tips for generating in the flowstream a pair of counter-rotating trailing vortices which confluence together in the wake of the bluff body in a direction substantially orthogonal to the flowstream, and said confluence drawing the flowstream in and around behind the trailing end to raise the pressure on the base surface and reduce the aerodynamic base drag.

Another aspect of the present invention includes an apparatus for reducing the aerodynamic base drag of a bluff body said apparatus comprising: means for generating in a flowstream at least one pair of counter-rotating vortices alongside the bluff body which confluences together downstream in the wake of the bluff body in a direction substantially orthogonal to the flowstream such that the confluence draws the flowstream around behind a trailing end of the bluff body to raise the pressure in a recirculation zone thereof and reduce the aerodynamic base drag.

Another aspect of the present invention includes a vehicle accessory for reducing the aerodynamic base drag of a bluff body vehicle comprising: a pair of lift surfaces extending to lift surface tips and connectable to the bluff body so that the lift surface tips are positioned substantially alongside the bluff body to generate, in a flow stream substantially parallel to a longitudinal centerline of the bluff body vehicle, a pair of counter-rotating trailing vortices which confluence together downstream in the wake of the bluff body in a direction substantially orthogonal to the flowstream, whereby the confluence draws the flowstream in and around behind a trailing end of the bluff body to raise the pressure in a recirculation zone thereof and reduce the aerodynamic base drag.

Another aspect of the present invention includes, in a bluff body land-based vehicle having a leading end, a trailing end, a top surface, opposing first and second side surfaces, and a substantially flat base surface at the trailing end substantially normal to a longitudinal centerline of the bluff body, the improvement comprising: means located alongside at least one of the top surface and first and second side surfaces for generating, in a flowstream substantially parallel to the longitudinal centerline, a pair of counter-rotating vortices which confluence together downstream in the wake of the vehicle in a direction orthogonal to the flowstream such that the confluence induces the flowstream passing over the top surface to turn down and around behind the trailing end to raise the pressure on the base surface and reduce the aerodynamic base drag.

Another aspect of the present invention includes a method of reducing aerodynamic base drag of a bluff body vehicle adjacent a ground plane in a flowstream substantially parallel to a longitudinal centerline of the bluff body vehicle, said bluff body vehicle having a leading end, a trailing end, a top surface, opposing left and right side surfaces, and a base surface at the trailing end substantially normal to the longitudinal centerline of the bluff body, said method comprising: generating a pair of counter-rotating vortices from alongside at least one of the top and left and right side surfaces of the bluff body to confluence downstream in the wake of the vehicle in a direction substantially orthogonal to the flowstream, whereby said confluence draws the flowstream in and around behind the trailing end to raise the pressure on the base surface and reduce the aerodynamic base drag.

Another aspect of the present invention includes a method of reducing aerodynamic base drag of a bluff body vehicle moving in close proximity to a ground plane in a flowstream substantially parallel to a longitudinal centerline of the bluff body, said bluff body having a base surface at a trailing end thereof, said method comprising: providing alongside the vehicle upstream of the base surface a pair of lift surfaces extending to lift surface tips, said pair of lift surfaces capable of inducing generation of a pair of counter-rotating trailing vortices when in the flowstream, and said lift surface tips substantially near the bluff body to confluence the vortices downstream in the wake of the vehicle in a direction substantially orthogonal to the flowstream, wherein said confluence draws the flowstream in and around behind the trailing end to raise the pressure on the base surface and reduce the aerodynamic base drag.

Another aspect of the present invention includes a method of reducing aerodynamic drag of a bluff body in a flowstream substantially parallel to the longitudinal centerline of the bluff body, said method comprising: generating at least one pair of counter-rotating vortices alongside the bluff body to induce downstream confluence of said vortices in the wake of the bluff body in a direction substantially orthogonal to the flowstream, whereby the confluence draws the flowstream down and around a trailing end of the bluff body to raise the pressure in a recirculation zone thereof and reduce the aerodynamic base drag.

BRIEF DESCRIPTION OF THE DRAWINGS

The accompanying drawings, which are incorporated into and form a part of the disclosure, are as follows.

DETAILED DESCRIPTION

The present invention is directed to an aerodynamic base drag reduction apparatus and method for use with a bluff body or bluff body vehicle, such as for example a tractor-trailer or other land-based vehicle. "Bluff bodies" are one of two types of fluid-dynamic shapes (the other being "streamlined bodies") and can be generally characterized by the presence of a sizeable recirculation zone in the wake of the bluff body. Thus, bluff bodies are characteristically blunt-ended, non-streamlined moving bodies having a relatively large base surface at a trailing end which causes the large recirculation zone in the wake of the bluff body to produce the base drag. And the base surface of a bluff body vehicle is typically of a type oriented substantially normal to the flowstream, as is commonly seen in tractor-trailer arrangements. This arrangement creates a sharp separation of the flow stream at the edge of base surface and thereby lowers the pressure on the base surface to produce the base drag. It is appreciated that the present invention may be utilized with different types of vehicles including automobiles, aircraft, or any other vehicle encumbered by a recirculation zone characteristic of a bluff body. For land-based bluff body vehicles traveling in close proximity to a ground plane, the present invention may also benefit from the in ground effect which is generally a condition of improved performance encountered when operating near or on the ground due to the interference of the ground surface with the airflow pattern.

Figure 1:
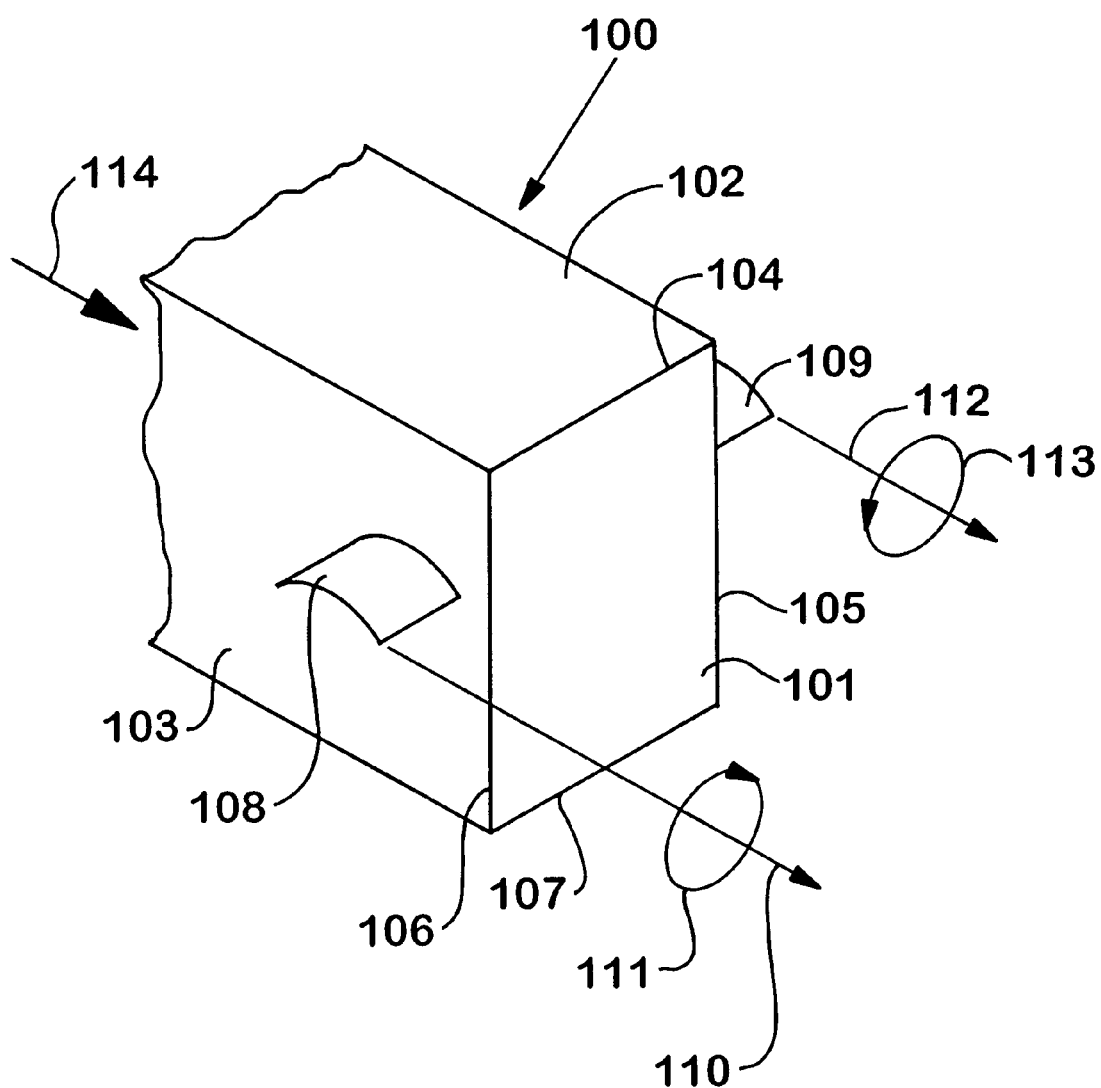
FIG. 1 is a rear perspective view of a first exemplary embodiment of the present invention utilized on a bluff body.

Turning now to the drawings, FIG. 1 shows an exemplary embodiment of the base drag reduction apparatus, comprising a pair of lift surfaces 108 and 109. The lift surfaces are shown connected to a bluff body, generally indicated at reference character 100, with the connection and attachment provided by suitable mounting hardware (not shown). FIG. 1 also shows the trailing end of the bluff body 100 having a left side 103, an opposite right side (not shown), a top surface 102, and a base surface 101 at the rear of the trailing end. The base surface 101 is joined (a) to the top surface 102 at an upper trailing edge 104, (b) to the left side 103 at a left side trailing edge 106, (c) to the right side at a right side trailing edge 105, and (d) to the bottom surface (not shown) at bottom trailing edge 107. While not shown in FIG. 1, the bluff body may be a land-based vehicle having wheels (not shown) extending below the bottom surface. Additionally, while not shown in FIG. 1, the bluff body 100 is of a type having a leading end opposite the trailing end, with a longitudinal centerline through the leading and trailing ends which is generally parallel to the direction of a flowstream indicated at 114.

Lift surfaces 108 and 109 are shown utilized in FIG. 1 to generate a pair of counter-rotating vortices, indicated at arrows 111 and 113 in a flowstream indicated at 114. The counter-rotating vortex pair is generated by the pair of lift surfaces which are shown located alongside the left side surface 103 and right side surface on opposite sides of the bluff body, and which preferably extend in substantially opposite directions to each other to lift surface tips. Alternatively, the counter-rotating vortices may be generated using lift surfaces alongside at least one of the top surface 102 and left 103 and right side surfaces of the bluff body. In any case, the lift surfaces generate positive lift, such that the left-hand vortex 111 has a clockwise sense of rotation, while the right-hand vortex 113 has a counter-clockwise sense of rotation. Vortices of the same senses of rotation as those shown in FIG. 2 can also be produced by lift surfaces positioned on the top of the bluff body.

Figure 2:
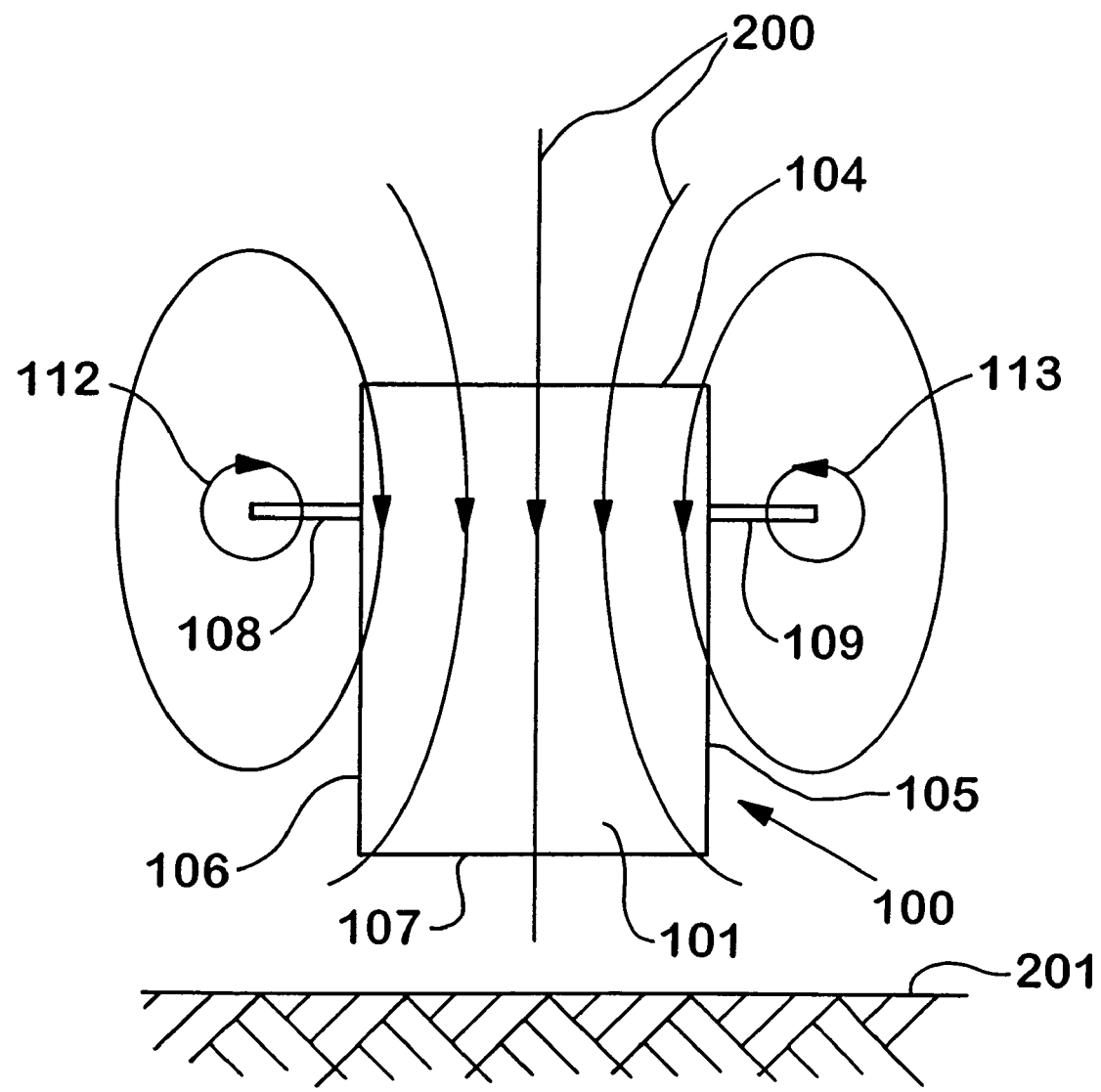
FIG. 2 is a rear view of the trailing end of the first exemplary embodiment of FIG. 1 showing the confluence of a pair of counter-rotating vortices in a downsared direction.

It is appreciated that the use of lift surfaces extending to lift surface tips produces the "trailing vortices" shown in FIGS. 1 and 2 and the phenomenon of downwash often seen in the wake of an airplane and studied at great length. Trailing vortices are known in airplane flow dynamics to originate near the wingtip and are formed because the wing develops lift. That is, the pressure on the top of the wing is lower than on the bottom. Near the wingtips this pressure difference causes the air to move around the edge from the bottom surface to the top. This results in a roll-up of the fluid, which then forms the trailing vortex. Similarly, the trailing vortices 111 and 113 are generated by pressure differences at the lift surface tips. In contrast to trailing vortices seen in airplanes, however, the lift surfaces and the lift surface tips of the present invention are suitably close to the bluff body to produce the vortices in a boundary flow layer of the bluff body and thus enables confluence of the vortices in the wake of the vehicle. In this manner, the pair of counter-rotating trailing vortices are generated, harnessed, and directed into the wake behind the bluff body. The respective wakes produced by the individual lift surfaces 108 and 109 are indicated at lines 110 and 113. Additionally, 110 and 113 also represent the rotational axes of the counter-rotating vortices.

It is appreciated that while a pair of lift surfaces is shown and discussed, any other suitable means for generating a pair of counter-rotating vortices may be utilized and provided alongside the bluff body. In this regard, it is notable that the means for generating the pair of counter-rotating vortices may be an active production, such as an actively driven propeller, or by passive inducement. The lift surfaces are one example of inducing the pair of counter-rotating in the presence of a flowstream, whereas a driven propeller (for example) would actively produce the vortex with or without placing the vehicle in the flowstream.

FIG. 2 shows a rear view of the drag reduction principle of the present invention which basically functions by generating at least one pair of counter-rotating vortices which confluence together in the wake of the bluff body centered behind the base surface. By confluencing the pair of counter-rotating vortices, the flow stream traveling adjacent the confluence is drawn by the confluence in and around the trailing end into the wake of the vehicle. The confluence thus operates to draw, turn, or otherwise redirect the flowstream in and around the trailing end to increase the pressure in the recirculation zone and on the base surface. At the rear of the bluff body, these counter-rotating vortices induce a downwash velocity as shown by the streamlines 200, which allows the flow to turn more sharply around the base of the bluff body. This in turn raises the pressure on the base of the bluff body, and hence reduces and therefore improves the aerodynamic base drag. Consequently, the pressure on the base of the bluff body is increased, the size of the bluff body wake is decreased, and the overall aerodynamic drag decreased. In addition to a single, counter-rotating vortex pair, multiple counter-rotating vortex pairs can produce the same drag reduction.

Figure 3:
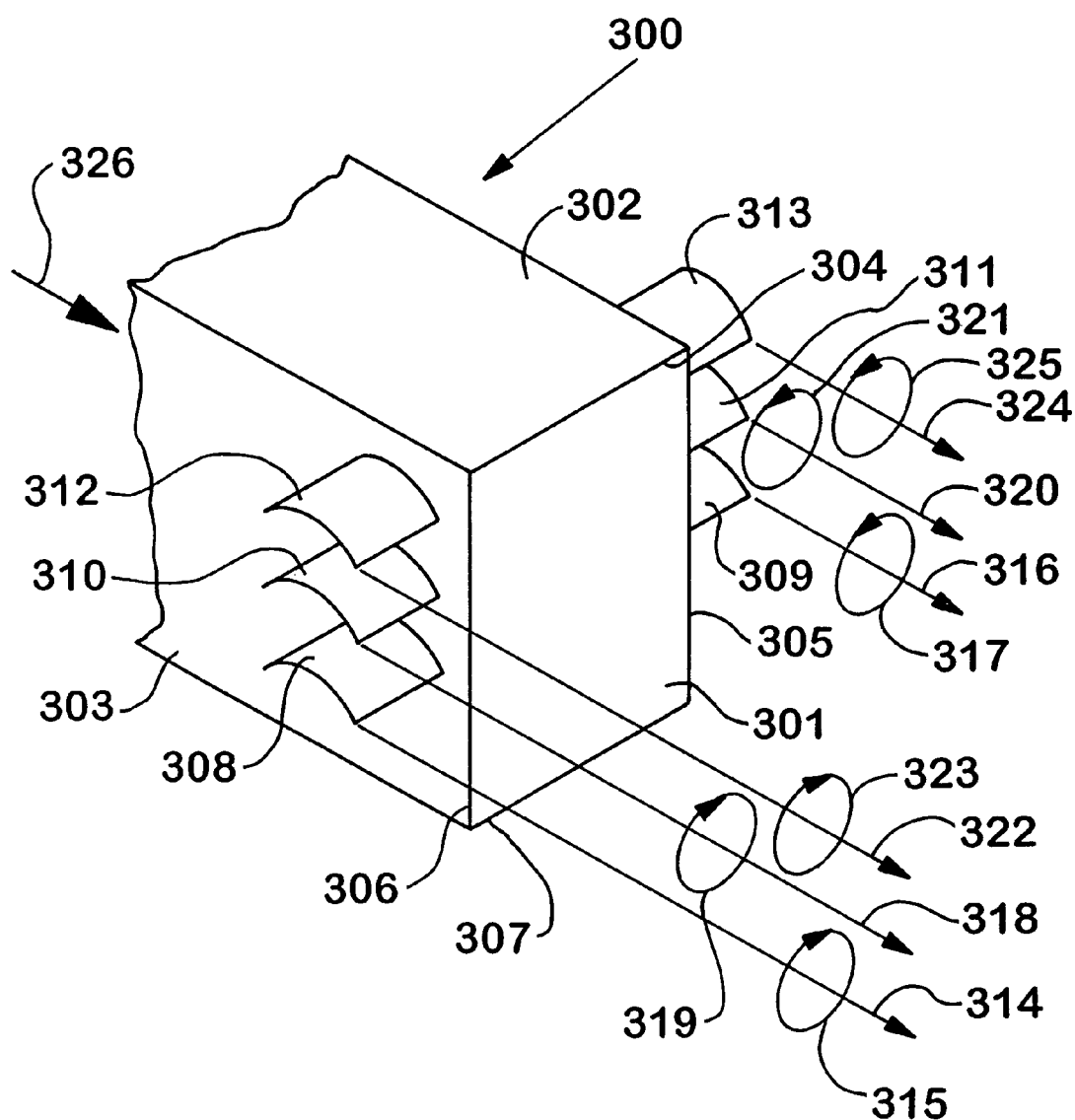
FIG. 3 is a rear perspective view of a second exemplary embodiment of the present invention utilized on a bluff body.
Figure 4:
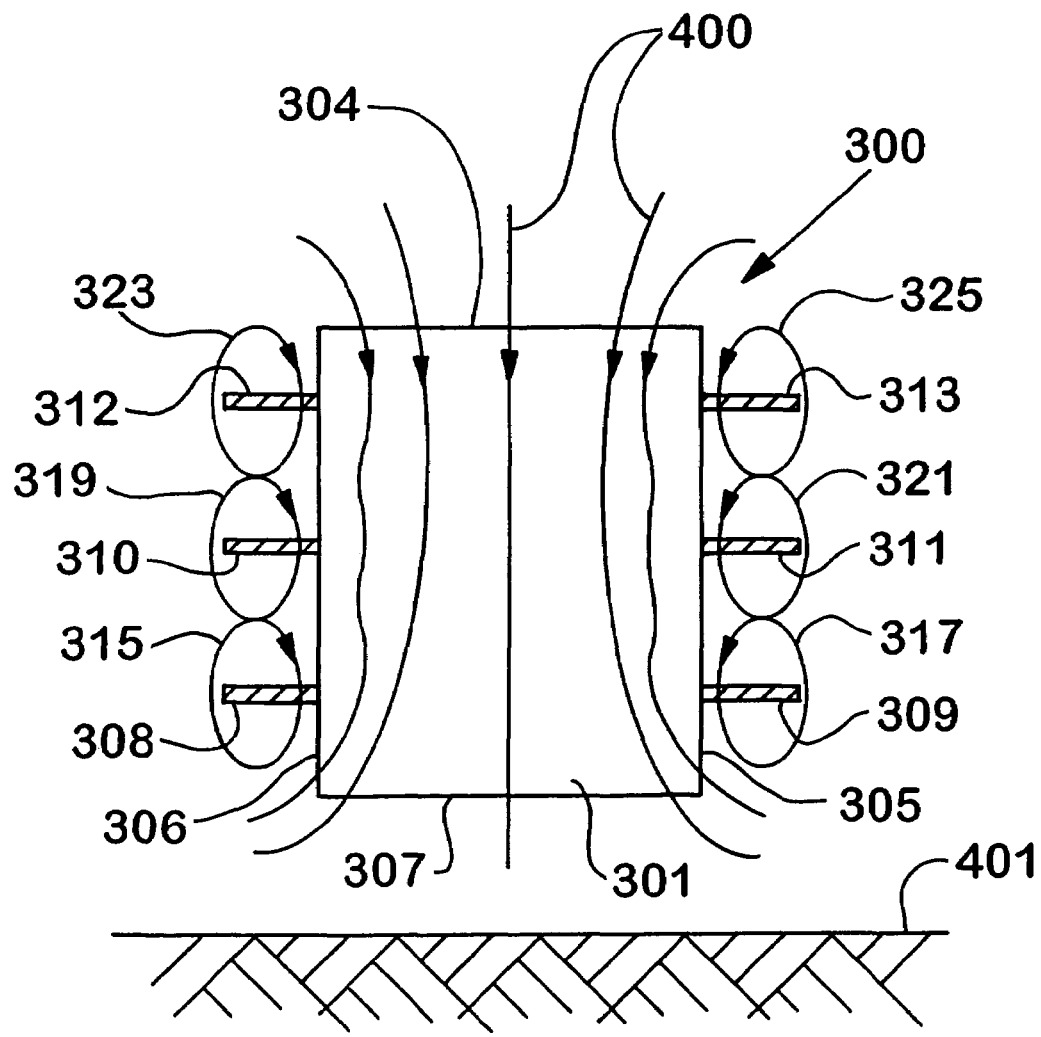
FIG. 4 is a rear view of the trailing end of the second exemplary embodiment of FIG. 3 showing the confluence of the multiple pairs of counter-rotating vortices in a downward direction.

FIGS. 3 and 4 demonstrate an exemplary case illustrating the use of multiple pairs of lifting surfaces to generate additional pairs of counter-rotating vortices which confluence in the wake behind the trailing end of the bluff body. FIGS. 3 and 4 show in particular the use of three counter-rotating vortex pairs, i.e. 323 and 325, 319 and 321, and 315 and 317, generated by lift surface pairs 312 and 313, 310 and 311, and 308 and 309, respectively. As can be seen the vortices generated from the left side 303, i.e. 323, 319, and 315 all rotate in the same direction about parallel rotational axes 322, 318, and 313, respectively. The vortices on the left-side of the body clockwise senses of rotation, while those on the right-side have counter-clockwise senses of rotation. And FIG. 4 shows these counter-rotating vortex pairs producing the downwash flow field similar to the discussion of FIG. 2. As indicated by the confluence lines 400, the pairs of counter-rotating trailing vortices all confluence together in the same direction to direct the flowstream 326 passing over the top surface 304 down and around the base surface 301, and into the wake behind the back surface.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. A method of reducing aerodynamic base drag of a bluff body vehicle adjacent a ground plane in a flowstream substantially parallel to a longitudinal centerline of the bluff body vehicle, said bluff body vehicle having a leading end, a trailing end, a top surface, opposing left and right side surfaces, and a base surface at the trailing end substantially normal to the longitudinal centerline of the bluff body, said method comprising:

generating a pair of counter-rotating vortices from alongside the bluff body upstream of the base surface to confluence downstream in the wake of the vehicle in a direction substantially orthogonal to the flowstream, whereby said confluence draws the flowstream in and around behind the trailing end to raise the pressure on the base surface and reduce the aerodynamic base drag.

2. The method of claim 1,
wherein a pair of lift surfaces extending to lift surface tips are utilized to induce generation of the pair of counter-rotating vortices as trailing vortices.

3. The method of claim 2,
wherein the pair of lift surfaces extend in substantially opposite directions from each other.

4. The method of claim 2,
further comprising utilizing at least one additional pair of said lift surfaces to induce generation of a corresponding number of additional pairs of counter-rotating trailing vortices.

5. The method of claim 4,
wherein the pairs of counter-rotating trailing vortices are generated to confluence in the same direction.

6. The method of claim 1,
wherein the pair of counter-rotating vortices are generated from alongside the left and right sides of the vehicle to confluence downstream in the wake of the vehicle in a downward direction to the flowstream, whereby said confluence draws the flowstream passing over the top surface down and around behind the trailing end to raise the pressure on the base surface and reduce the aerodynamic base drag.

7. The method of claim 6,
wherein a pair of lift surfaces extending to lift surface tips are utilized to induce generation of the pair of counter-rotating vortices as trailing vortices.

8. The method of claim 7,
wherein the pair of lift surfaces extend in substantially opposite directions from each other.

9. The method of claim 7,
further comprising utilizing at least one additional pair of said lift surfaces to induce generation of a corresponding number of additional pairs of counter-rotating trailing vortices.

10. The method of claim 9,
wherein the pairs of counter-rotating trailing vortices are generated to confluence in the same direction.

11. The method of claim 1,
further comprising generating at least one additional pair of said counter-rotating vortices.

12. The method of claim 11,
wherein the pairs of counter-rotating vortices are generated to confluence in the same direction.

13. The method of claim 1,
wherein the bluff body vehicle is a tractor-trailer.

14. A method of reducing aerodynamic base drag of a bluff body vehicle moving in close proximity to a ground plane in a flowstream substantially parallel to a longitudinal centerline of the bluff body, said bluff body having a base surface at a trailing end thereof, said method comprising:
providing alongside the vehicle upstream of the base surface a pair of lift surfaces extending to lift surface tips, said pair of lift surfaces capable of inducing generation of a pair of counter-rotating trailing vortices when in the flowstream, and said lift surface tips substantially near the bluff body to confluence the vortices downstream in the wake of the vehicle in a direction substantially orthogonal to the flowstream, wherein said confluence draws the flowstream in and around behind the trailing end to raise the pressure on the base surface and reduce the aerodynamic base drag.

15. The method of claim 14,
wherein the pair of lift surfaces are provided on left and right sides of the vehicle upstream of the base to confluence downstream in the wake of the vehicle, with said downwash confluence drawing an upper flow above the vehicle down and around behind the base to raise the pressure on the base and reduce the aerodynamic base drag.

16. The method of claim 14,
wherein the pair of lift surfaces extend in substantially opposite directions from each other.

17. The method of claim 14,
further comprising providing at least one additional pair of said lift surfaces to generate a corresponding number of additional pairs of counter-rotating trailing vortices.

18. The method of claim 17,
wherein the pairs of counter-rotating trailing vortices are generated to confluence in the same direction.

19. The method of claim 14,
wherein the bluff body vehicle is a tractor-trailer.

20. A method of reducing aerodynamic drag of a bluff body in a flowstream substantially parallel to the longitudinal centerline of the bluff body, said method comprising:
generating at least one pair of counter-rotating vortices alongside the bluff body to induce downstream confluence of said vortices in the wake of the bluff body in a direction substantially orthogonal to the flowstream, whereby the confluence draws the flowstream down and around a trailing end of the bluff body to raise the pressure in a recirculation zone thereof and reduce the aerodynamic base drag.

* * * * *